United States Patent
Buhr et al.

(10) Patent No.: US 6,369,901 B1
(45) Date of Patent: *Apr. 9, 2002

(54) DIGITAL PHOTOFINISHING SYSTEM INCLUDING DIGITAL IMAGE PROCESSING OF ALTERNATIVE CAPTURE COLOR PHOTOGRAPHIC MEDIA

(75) Inventors: John D. Buhr, Webster; Frank R. Brockler, Macedon; Allan F. Sowinski, Rochester, all of NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 09/627,998

(22) Filed: Jul. 28, 2000

Related U.S. Application Data

(62) Division of application No. 09/104,548, filed on Jun. 25, 1998, which is a continuation of application No. 09/086,333, filed on May 28, 1998, which is a continuation of application No. 09/086,146, filed on May 28, 1998, now Pat. No. 6,097,471, which is a continuation of application No. 09/085,788, filed on May 28, 1998, now Pat. No. 6,097,470, which is a continuation of application No. 09/086,044, filed on May 28, 1998, now Pat. No. 5,995,654.

(51) Int. Cl.[7] .............................................. G06K 15/00
(52) U.S. Cl. ........................................ 358/1.1; 358/1.9
(58) Field of Search ....................... 358/1.1, 1.9, 1.17, 358/518, 527, 525, 449; 382/141, 167, 168; 355/32, 35, 40, 77

(56) References Cited

U.S. PATENT DOCUMENTS

| | | | |
|---|---|---|---|
| 4,500,919 A | * | 2/1985 | Schreiber .................... 358/518 |
| 4,945,406 A | * | 7/1990 | Cok .......................... 358/506 |
| 4,979,032 A | * | 12/1990 | Alessi et al. ................. 358/527 |
| 5,012,333 A | * | 4/1991 | Lee et al. .................... 382/141 |
| 5,134,573 A | * | 7/1992 | Goodwin ..................... 364/525 |
| 5,267,030 A | * | 11/1993 | Giorgianni et al. .......... 358/527 |
| 5,300,381 A | * | 4/1994 | Buhr et al. ................... 430/30 |
| 5,579,132 A | * | 11/1996 | Takahashi et al. ........... 358/527 |
| 5,608,542 A | * | 3/1997 | Krahe et al. ................. 358/449 |
| 5,687,303 A | * | 11/1997 | Motamed et al. ........... 358/1.18 |
| 5,731,823 A | * | 3/1998 | Miller et al. ................... 347/5 |
| 5,804,356 A | * | 9/1998 | Cole et al. ................... 358/518 |
| 6,163,389 A | * | 12/2000 | Buhr et al. .................. 358/527 |

FOREIGN PATENT DOCUMENTS

EP 0665677 A2 * 2/1995

* cited by examiner

Primary Examiner—Gabriel Garcia
(74) Attorney, Agent, or Firm—William F. Noval

(57) ABSTRACT

A method of digital photofinishing including the steps of: producing a digital color image in printing densities of a color image captured on alternative capture photographic media; first mapping the printing densities of the alternative capture photographic media to the printing densities that would have been obtained for reference color photographic media; processing the mapped digital color image with a scene balance algorithm to produce a processed digital color image; second mapping the processed digital color image through a hard copy media characteristic curve to produce a mapped digital color image mapped to print densities of the hard copy media; sharpening the mapped digital color image with a sharpening algorithm optimized to avoid unacceptable artifacts; and digitally printing the sharpened digital color image onto hard copy media.

2 Claims, 3 Drawing Sheets

DIGITAL PHOTOFINISHING SYSTEM INCLUDING DIGITAL IMAGE PROCESSING OF ALTERNATIVE CAPTURE COLOR PHOTOGRAPHIC MEDIA

"CROSS REFERENCE TO RELATED APPLICATIONS"

This is a Divisional Patent Application of U.S. Ser. No. 09/104,548, filed on Jun. 25, 1998, which is a continuation of U.S. patent application Ser. No. 09/086,333, filed May 28, 1998, inventors Buhr et al.; U.S. patent application Ser. No. 09/086,146, filed May 28, 1998, now U.S. Pat. No. 6,097,471, inventors Buhr et al.; U.S. patent application Ser. No. 09/085,788, filed May 28, 1998, now U.S. Pat. No. 6,097,470, inventors Buhr et al.; and U.S. patent application Ser. No. 09/086,044, filed May 28, 1998, now U.S. Pat. No. 5,995,654 inventors Buhr et al.

FIELD OF THE INVENTION

This invention relates in general to digital photofinishing systems and more particularly to a digital photofinishing system selectively including film under exposure gamma, scene balance, contrast normalization, and sharpening digital image processing for alternative capture color photographic media.

BACKGROUND OF THE INVENTION

Several problem areas need to be addressed when making color negative paper prints from color negative film images. The object of the process is to make a pleasing print from the film image. The first problem is to find the level of exposure necessary in a projection printer system to produce that pleasing print. In the simplest implementation of a process, one projects the color negative film image onto a photosensitive paper image receiver, processes the paper, and then repeats the process until a pleasing print has been obtained. In automated photo-finishing operations, a film scanner reads densities from the negative and passes the information to a computer algorithm that computes the appropriate exposure values so that a pleasing print can be obtained. At this point, the conventional photographic printing process ends. That is, if there are any remaining problems in a photographic image, no other simple processes are available to reduce the severity of the problem. Problems such as film under-exposure or over-exposure, inappropriate gamma for a particular scene, poor quality camera or printer lenses, low or high activity of film or paper processes, poor scene balance, and poor sharpness in the final image remain that we would like to correct or modify.

Methods and systems have been described for more than 10 years that are devoted to producing pictorial images on various media and devices from scenes captured on photographic film, via scanning to produce a digital image, image processing, and output rendering. Examples include the following.

Journal of Imaging Technology, Vol. 14, Number 3, June 1988, Firth et. al. describe systems that capture scenes on film, scan film to produce a digital image, digitally process the image, and output via a laser AgX printer.

U.S. Pat. No. 4,500,919, Schreiber discloses an image reproduction system that scans an image captured on film, displays the image on a video monitor, enables image processing, and finally output to an inked hardcopy.

U.S. Pat. No. 4,979,032 (Dec. 18, 1990, filing date: Dec. 27, 1988), Alessi et al. describe an apparatus, including a film scanner, a video monitor, image processing, and output, to produce various output visually matched to the image displayed on the monitor.

U.S. Pat. No. 5,267,030, issued Nov. 30, 1993, inventors Giorgianni et. al. describe method and means to transform images captured on film, via digitization on a film scanner, to a color metric or other space, with output onto a variety of media and devices. This document describes the improvements offered by digital image processing, including aesthetically pleasing modifications to the tone and color reproduction as well as sharpening.

U.S. Pat. No. 5,300,381, issued Apr. 5, 1994, inventors Buhr et. al. describe a pictorial imaging system that consists of capture on photographic film, film scanning to produce a digital image, image processing, and digital output.

U.S. Pat. No. 5,579,132, issued Nov. 26, 1996, inventor Takahashi describes an image processing system devoted to storing or producing images that have "substantially the same color" or additional "aesthetic color correction" versus the original scene, based on a variety of image processing transformations of the digitized image.

U.S. Pat. No. 5,608,542, issued Mar. 4, 1997, inventors Krahe et. al. describe a system that produces index prints based on scanning a film frame, image processing, and rendering.

U.S. Pat. No. 4,945,406, issued Jul. 31, 1990, inventor Cok, describes a system for achieving automatic color balancing of color images by transferring color pixel values from log exposure RGB color values into printing density values and generating color correction offset values utilizing a printing density based color correction method.

The KODAK 35 mm/24 mm color negative film format Index Printer, sold by Kodak, produces an index print (a matrix of small imagettes) reproduced from individual film image frames. The index print is produced by the photofinisher when the original print order is processed and is supplied to the customer as a convenient means of identifying image frames on the film (see: U.S. Pat. No. 5,608,542, above). The Kodak Index Printer uses image processing on the miniature images including:

digital image in film RGB printing density applying a scene balance algorithm to balance the digital film printing density image mapping the color negative digital image onto a color paper (EDGE-type) characteristic curve digital sharpening rendering using a CRT printer onto photographic paper In the Index Printer, the above image processing: (1) is not applied to full frame images in a digital color printer; and (2) is not applied to high resolution images in a digital color printer, only low resolution images.

U.S. Pat. No. 5,134,573, issued Jul. 28, 1992, inventor Goodwin, discloses a method for increasing the range of values representing a color image which exhibit a linear response. The toe and/or shoulder regions of the film's three density vs. log exposure tables are straightened using look up tables.

U.S. Pat. No. 5,012,333, issued Apr. 30, 1991, inventors Lee et al., discloses a dynamic range adjustment system for printing digital images based on visual photoreceptor adaption and human visual contrast sensitivity. The system adjusts the contrast of the low frequency component only of the image, preserving the high frequency component in its contrast.

All of these articles or patents describe, in one form or another, processes for obtaining more pleasing prints from a film image capture than the conventional optical process. There is thus a need for a solution to these problems, which can be incorporated into a digital photofinishing system.

While it is straight-forward to produce high-quality images from high-quality media capture through standard optical-printing photo-finishing on high-quality color photographic paper using high-quality chemical processing and printing equipment that is properly run, it would be beneficial to produce high-quality images from capture media that would not produce such results using the same optical printing photo-finishing path. Such light-sensitive media might be lower in cost or unsuitable for optical printing, and use conventional chemical processing, alternate chemical processing, or other non-traditional image development processing, such as that used in instant photography or applied heat without liquids.

SUMMARY OF THE INVENTION

According to the present invention, there is provided a solution to the problems of the prior art.

According to a feature of the present invention, there is provided a method of digital photofinishing comprising the steps of: producing a digital color image in printing or other densities of a color image captured on alternative capture photographic media; first mapping the printing or other densities of the alternative capture photographic media to the printing densities that would have been obtained for reference color photographic media; processing the mapped digital color image with a scene balance algorithm to produce a processed digital color image; second mapping the processed digital color image through a hard copy media characteristic curve to produce a mapped digital color image mapped to print densities of the hard copy media; sharpening the mapped digital color image with a sharpening algorithm optimized to avoid unacceptable artifacts; and digitally printing the sharpened digital color image onto hard copy media.

According to another feature of the present invention, there is provided a method of digital photofinishing comprising the steps of: producing a digital color negative image in optical or other printing densities of a color image captured on a color negative photographic element which is optimized for producing a color image suited for conversion to an electronic form and subsequent reconversion into a viewable form; mapping the printing densities of the digital color negative image to the printing densities that would have been obtained for the reference color negative photographic element; processing the mapped digital color negative image with an underexposure scene balance algorithm; mapping the processed digital color negative image through a hard copy media characteristic curve to produce a digital color positive image; sharpening the mapped digital color positive image with a sharpening algorithm optimized to avoid unacceptable artifacts; and digitally printing the sharpened digital color image onto hard copy media.

ADVANTAGEOUS EFFECT OF THE INVENTION

The invention has the following advantages.

1. A digital photofinishing system is provided that produces high quality digital photographic reflection prints from alternative color negative film images that match those that would have been obtained from a reference film at high print rates.
2. Sharpness that is difficult to correct in conventional optical photofinishing systems is corrected by digital image processing in a digital photofinisher.
3. Prints produced by the digital photofinishing system of the invention were preferred over prints produced by optical photofinishing systems.
4. Prints produced by the digital photofinishing system that have improved overall print contrast from color film negatives that are under-exposed.
5. Prints produced by the digital photofinishing system that have a preferred image contrast position relative to a traditional optical print.
6. The contrast normalization algorithm improves quality of low contrast scenes by increasing image contrast and of high contrast scenes by decreasing image contrast.
7. Improves quality of prints produced from low activity film and/or paper chemical processes by increasing the print contrast.
8. Improves quality of prints produced from high activity film and/or paper chemical processes by decreasing the print contrast.

DEFINITION OF TERMS

The term "reference color photographic media" is used to indicate conventional color negative film developed through conventional color negative film processing which is used to produce a color image on conventional color photographic paper using optical printing photofinishing.

The term "alternative capture color photographic media" is used to indicate one of the following.

1. A color negative or reversal photographic element for producing a color image suited for conversion to an electronic form and subsequent reconversion into a viewable form comprised of a support and, coated on the support, a plurality of hydrophilic colloid layers, including radiation-sensitive silver halide emulsion layers, forming layer units for separately recording blue, green, and red exposures, each of the layer units containing dye image-forming coupler chosen to produce image dye having an absorption half-peak bandwidth lying in a different spectral region in each layer unit, wherein the layer units are substantially free of colored masking coupler, the layer units each exhibit a dye image gamma of less than 1.5, the element exhibits an exposure latitude of at least 2.7 log E, where E is exposure measured in lux-seconds, and wherein the gamma ratio for each of the blue and red color recording units is between 0.8 and 1.2.
2. A color photothermographic element that is thermally processed. Specific examples of multicolor photothermographic elements are described by Ishikawa et al. in European Patent Application EP 0726201 A1.
3. A color photographic element processed by instant processing techniques.

DETAILED DESCRIPTION OF THE INVENTION

Figure 1:
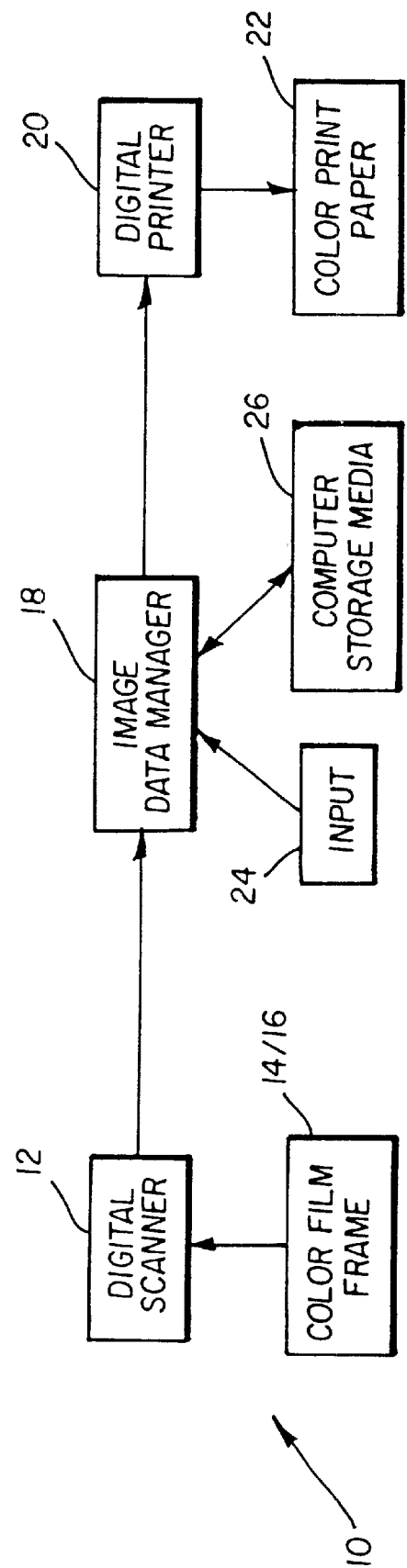
FIG. 1 is a block diagram of a digital photofinishing system incorporating the present invention.

Referring to FIG. 1, there is shown a block diagram of a digital photofinishing system 10 incorporating the present invention. As shown, system 10 includes a digital scanner 12 for scanning color photographic media 14 to produce a digital color image of a color image frame 16 on color media 14. Color media 14 is a negative film. Image data manager 18 processes the digital image to optimize the image for printing the processed image by printer 20 on color hard copy media 22. Color hard copy media can be any high quality reflection or transmissive media, such as silver halide color paper, and media used in ink jet, thermal, electrophotographic printing processes. The operation of scanner 12 and printer 20 are described in greater detail below.

Image data manager (IDM) 18 processes the digital color image from scanner 12. IDM 18 is preferably a digital computer having user input 24 (keyboard, mouse) and computer readable storage media input 26. Computer readable storage media may comprise, for example, magnetic storage media, such as a magnetic floppy disc or magnetic tape; optical storage media, such as optical disc, optical tape or machine readable bar code; solid state electronic storage devices, such as read only memory (ROM) or random access memory (RAM); or any other physical device or medium employed to store a computer program. The digital image processing techniques described below can be stored on readable storage media. Alternatively, some or all of the techniques may be incorporated into programmable gate arrays or other hard electronic devices.

Scanner

The scanner 12 for the production of digitally processed prints scans a 35 mm full frame image at a minimum resolution of m×n pixels. It would be preferred that the scanner produce a higher image resolution of, e.g., 2m×2n pixels so that "panoramic" images or enlargements can be printed with sufficient resolution without interpolation. The higher resolution is also preferred for the preparation of 5R prints. All magnifications higher than 5R will require higher resolution scans.

It is preferable that the scanner deliver the digitized data to the image processing algorithm as "printing density." A scanner that measures printing density has red, green, and blue effective spectral response that matches that of photographic paper in an optical printer. Photographic films intended for optical printing are designed based on the expectation that the captured information in the film will be read by this type of red, green and blue spectral response characteristic.

Even though the scanner is not considered part of the digital image processing path, some manipulations of the data may be required to deliver "printing density" to the processing algorithm. Two key steps are converting scanner densities to calibrated scanner densities, and converting the calibrated scanner densities to printing densities. Matrix operations may be required to perform these conversions.

The first step in the process is to convert the raw scanner numbers to calibrated scanner densities. If a matrix operation is used, an appropriate matrix correction model is shown below.

$$\begin{vmatrix} a_{11} & a_{12} & a_{13} & a_{1c} \\ a_{21} & a_{22} & a_{23} & a_{2c} \\ a_{31} & a_{32} & a_{33} & a_{3c} \end{vmatrix} * \begin{vmatrix} N_{rsr} \\ N_{rsg} \\ N_{rsb} \\ 1 \end{vmatrix} = \begin{vmatrix} D_{sr} \\ D_{sg} \\ D_{sb} \end{vmatrix}$$

$N_{rsx}$ is raw scanner number and $\overline{D}_{sx}$ is corrected scanner density.

The next process in the scanner converts calibrated scanner densities to calibrated printing densities. The process is implemented again with a matrix model that in this case can be up to a 3×10 matrix multiplication. An example is shown below.

$$\begin{vmatrix} a_{11} & a_{12} & a_{13} & a_{14} & a_{15} & a_{16} & a_{17} & a_{18} & a_{19} & a_{1c} \\ a_{21} & a_{22} & a_{23} & a_{24} & a_{25} & a_{26} & a_{27} & a_{28} & a_{29} & a_{2c} \\ a_{31} & a_{32} & a_{33} & a_{34} & a_{35} & a_{36} & a_{37} & a_{38} & a_{39} & a_{3c} \end{vmatrix} * \begin{vmatrix} D_{sr} \\ D_{sg} \\ D_{sb} \\ D_{sr}*D_{sr} \\ D_{sg}*D_{sg} \\ D_{sb}*D_{sb} \\ D_{sr}*D_{sg} \\ D_{sr}*D_{sb} \\ D_{sg}*D_{sb} \\ 1 \end{vmatrix} = \begin{vmatrix} D_{pr} \\ D_{pg} \\ D_{pb} \end{vmatrix}$$

The output of the matrix multiplication is calibrated printing density. $\overline{D}_{sx}$ is calibrated scanner density, and $\overline{D}$pxis calibrated printing density. Either or both of these steps can be implemented with a 3D look-up-table.

If the scanner does not measure "printing densities" directly for the alternate capture media, the "scanner densities" produced by the scanner can be transformed to reference printing densities for the alternate capture film as the first step in the image processing. Alternatively, the scanner densities for the alternate capture media may be passed to the Image Data Manager if the image processing parameters can accommodate this input type. These pathways permits using specially designed alternate capture media and scanners that result in identical images to those that would be obtained with the reference media and "printing density" scanners.

Figure 2:
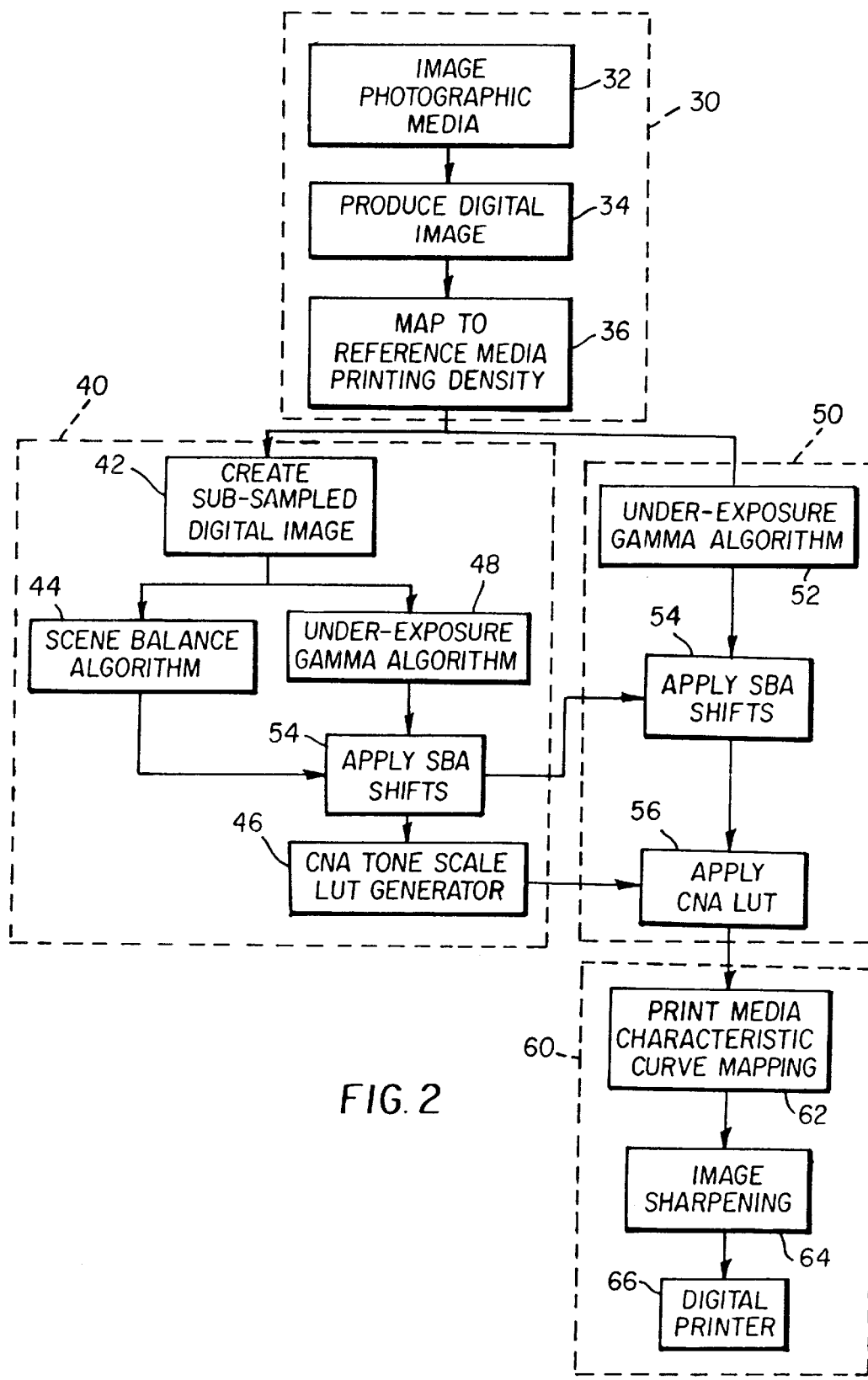
FIG. 2 is a flow diagram of a preferred method of the present invention.

FIG. 2 is a flow diagram of a general image processing system for digital photofinishing incorporating the method of the invention. The diagram is divided into several sections: digital image acquisition (box 30), the analytical section (box 40) performs analytical evaluations to prepare shift values for color and density balance, and tone look up table preparation for control of final print contrast. This information is then passed into the processor section (box 50) of the model to prepare the digitized film image for printing section (box 60).

In the image acquisition section, an image on photographic media (negative film) (box 32) is scanned (by scarmer 12) to produce a full resolution digital image (box 34).

Conversion to Reference Media Printing Densities

The first step in the image processing is to convert the densities produced by the scanner from the scanned alternate capture photographic media to the printing densities that would have been produced from the reference color photographic media (box 36). This is accomplished by applying a conversion matrix or 3D look-up table to the pixel densities in the captured image.

The conversion matrix or 3D look-up table can be created by subjecting the alternate capture media and the reference media to the same set of exposures. The exposures are selected to sample the exposure range that the media and reference media would experience in their red, green, and blue response channels when used for image capture in the marketplace. To provide an accurate density conversion, it is recommended that at least 70 different exposure values be used to create the densities for the films that will be used to calculate the matrix or 3D look-up table, using regression techniques or look-up table populating techniques (for example, U.S. Pat. No. 4,941,039). After appropriate chemical processing of the reference media, and appropriate chemical or other processing of the alternative capture media to be used, the densities for the alternate capture media are measured using the spectral responsivities that represent the densities that will be transmitted to the Image Data Manager 18, and the densities for the reference media are measured in reference printing densities. A matrix or 3D look-up table is calculated from this data that maps the alternate capture media densities to the printing densities for the reference media.

The preceding paragraph describes the preferred method of converting the densities from a specific alternate capture media to a specific reference media. For convenience, it may be necessary to map several alternate capture media densities to one reference media. In this case, approximate conversion matrices and 3D look-up tables may also be used to effect the density conversion from alternate capture media to reference capture media, with somewhat less resultant print quality. These parameters may be obtained for similar alternate capture or reference capture materials.

A more preferred method for image pixel density conversion from alternate capture media to reference capture media incorporates the application of red, green, and blue channel 1D look-up tables prior to and/or after the application of the matrix or 3D look-up table. The 1D look-up tables can be used to correct gross differences in the characteristic curves for the alternate and reference capture media.

In principle, the conversion from alternate media capture densities to reference media printing densities could be made at different points in the image processing change. However, the preferred location is prior to the Analysis step.

Analytical Section

The image process begins with the digitized film image. The image, with a minimum resolution of m×n pixels, may be sampled down to a m'×n' pixel image that is analyzed by a scene balance algorithm (SBA), and a contrast normalization algorithm. This information is passed to the processor section of the algorithm so that the full resolution image, or any other subsampled image, can be processed by an equivalent process.

The analysis phase determines a set of shift values, to be added to the digitized pixel values, that are necessary to assure that the final print densities will be appropriate. The scene balance algorithm determines a set of densities that represent a form of "average densities" that are compared to a known set that produces a pleasing print. These numbers force the digitized image to print to the proper print density and color balance. The average densities are subtracted from the assumed gray density point of the paper look-up table to give shift values that will modify the image to produce a pleasing print for density and color balance. Next, the sub-sampled image is evaluated and corrected for under exposure (box 48).

The image is shifted to a new $D_{min}$ position so that the correction process produces no negative density values. A look-up table is applied to the sub-sampled image such that low film gamma information that is contained in the toe of the film sensitometric curve is changed in density to increase the gamma. The image is then shifted back to the original $D_{min}$ position (the two "shift" operations complement one another). The technique disclosed in U.S. Pat. No. 5,134,573, issued Jul. 28, 1992, inventor Goodwin, can be used. The shift values are then applied to the full resolution digital color image (box 46).

Finally, the sub-sampled image is analyzed using the contrast normalization algorithm (box 46). The algorithm produces a look-up table that is used to modify the printing density values of the image in a way that produces final print images with a more pleasing contrast. The look-up table does the slope correction in "t-space" luminance, the metric used by the scene balance algorithm. The tone scale modification is a two step process; first is the rotation to "t-space" followed by the actual algorithm that produces the look-up table. (See: U.S. Pat. No. 5,012,333, issued Apr. 30, 1991, inventors Lee et al.)

The analytical section produces two items that are sent to the processor section of the image processing algorithm; the computed shift values and the image dependent tone scale look-up table.

The look-up table used by the algorithm may be a universal table for all media types and conditions. Or it may be a function of media type, lab preference, or customer preference. If it is a function of media type, it may be accessed based on the DX code on the media.

The look-up table that is applied to correct the gamma of the capture media in the under-exposure region may be obtained from a number of different sources. The look-up table may be encoded optically or magnetically on the capture media. The look-up table may be calculated by the software from reference exposure patches on the capture media. Media reference exposure patches are described in U.S. Pat. No. 5,649,260. The look-up table or look-up table precursor data may be encoded on optical, magnetic, or other media that accompany the capture media. The look-up table may be selected or supplied, directly or indirectly, by the customer or processing lab. The look-up table may be accessed from a software embodiment database, based on the media type, lab preference, or customer preference. The look-up table may also be accessed via the intranet from an available repository, based on the media type, lab preference, or customer preference.

U.S. Pat. No. 5,134,573 teaches the calculation of correction look-up table with a limiting gamma enhancement value to avoid unwanted noise introduction. We have found that it is preferable in some cases to calculate the correction look-up table as a fraction, such as 0.5, of the gamma adjustment factor that is required to fully correct the media toe gamma to match that of the media in a normally exposed region.

In the absence of an exposure-density sensitometry present on the specific media providing the image that are being processed, the look-up table may be derived from different media response approximates, such as media aim sensitometry. In general, in the absence of customer preference, media-type specific look-up tables provide higher quality images, and the most preferred are the media-type population averages for the processing lab.

Scene Balance Mapping

The process of operating a two stage film/media printing system has as its most imposing task that of finding a density value on the film exposure and mapping the densities on that negative to the media so that the best overall density and color balance are obtained. The process is best illustrated by tying together a series of reference points showing the connections from a scene object to the photographic reproduction of the object.

Figure 3:
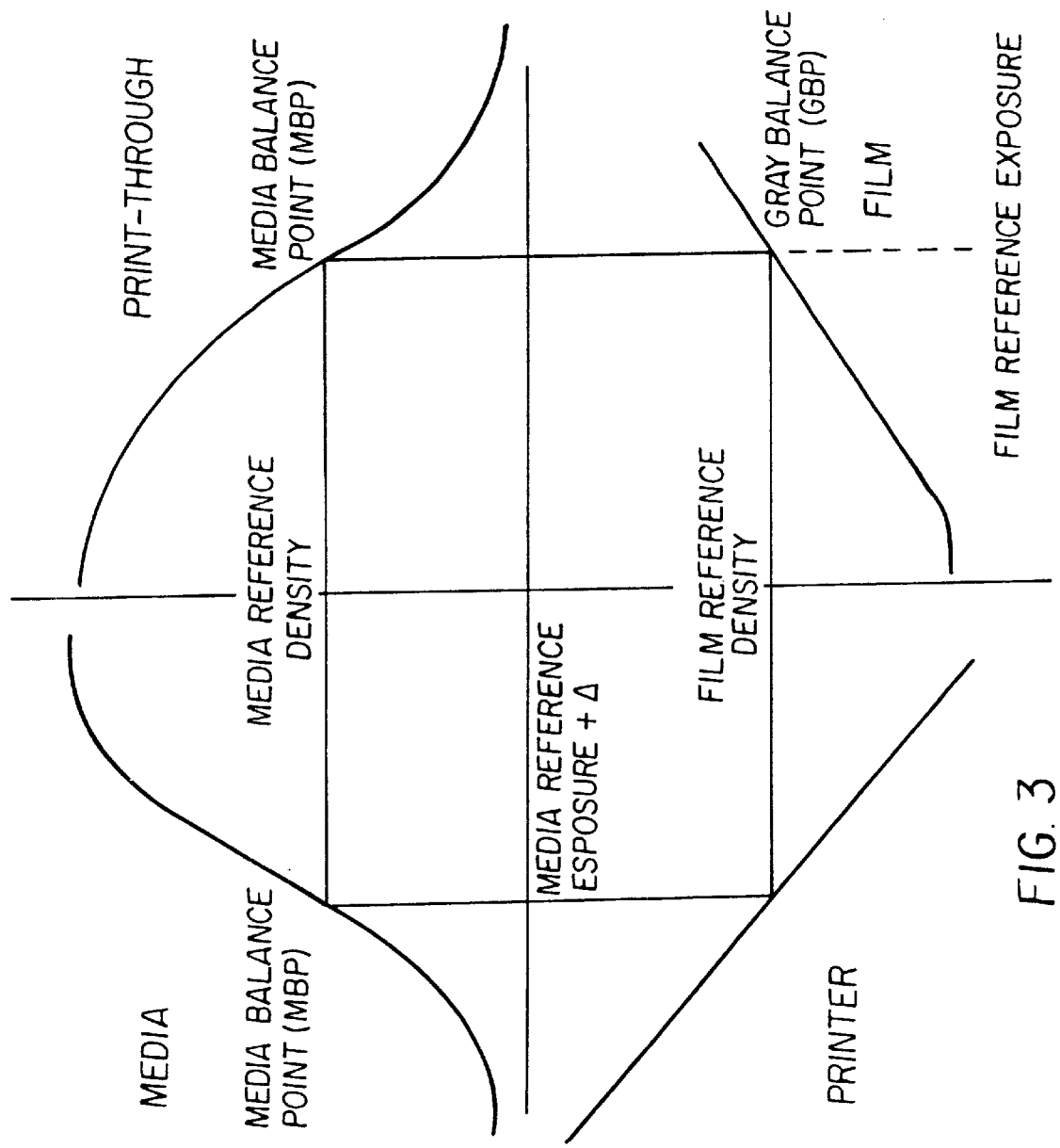
FIG. 3 is a graphical view useful in explaining aspects of the present invention.

FIG. 3, below, illustrates the concept of density tie points in our analysis of printing process. This process ties an initial target, usually a uniform gray card, to the photographic reproduction of that target. Test points are established for the initial exposure of the target object as an expected reference film density from a film reference exposure for the test object. The quadrant labeled "Printer" merely reflects the film reference density to the log exposure axis of the media. The test target will be assigned a density to be achieved for the reproduction of that object, or a density at the paper balance point. This point is characterized as the media reference exposure value and a media reference density value.

The objective of the scene balance process is to first determine the film density value for the film reference exposure and to determine the difference between this film density value and the media reference exposure value. The difference, or Δ, is added to the film reference density. This process assures that the quadrant labeled "Print Through" will yield the appropriate print density in the final reproduction of the scene.

Real photographic opportunities, or images, usually do not contain test objects that can be mapped in a formal process like that just described. Scene balance algorithms are designed to perform the task of estimating the reference film density, as if a gray card had been included in the scene. Once an estimate of the film reference density has been made, the process is duplicated just as described above. The examples show only one color record. Color films contain three records to capture the red, green, and blue information from a scene. Thus, the scene balance algorithms must perform two tasks. First estimate the overall density of the film image to that the best neutral density is obtained in the final print, or print through quadrant of the scene. Then the balance between the red, green, and blue exposure must be estimated.

Image Processor Section (box 50, FIG. 2)

The first step in the proposed image processing algorithm is deep under correction (box 52). A shift in the printing density data is performed so that a single column table can be used to shift the red, green, and blue pixel densities. In this instance, the red, green, and blue pixel printing density values are adjusted so that the film minimum densities values ($D_{min}$) are all 0.5. All of the digitized data then is modified by a table look-up process such that image densities that occur near or in the film sensitometric toe region are actually reduced to increase the image information gamma. The table consists of a single column of numbers. The column represents the substitution values for the red, green and blue pixel values. In the final step of the gamma correction process, a shift is applied that restores the density values to the previous unnormalized $D_{min}$ values.

The scene balance shift values are applied to the printing density values (box 54). These values represent the shift (add to the red, green, and blue pixel values) necessary to achieve a print that has the correct color balance and density.

Next, the tone scale look-up table from the analysis process is applied to the image (box 56). The image must first be rotated to "t-space" since the best tone scale results (image quality) are achieved when done on the luminance information. The matrix t_space.mat is used in this process.

$$\text{t\_space.mat} \begin{vmatrix} 1/3 & 1/3 & 1/3 \\ -1/4 & 1/2 & -1/4 \\ -1/2 & 0 & 1/2 \end{vmatrix}$$

$$\text{t\_space\_inv.mat} \begin{vmatrix} 1 & -2/3 & -1 \\ 1 & 4/3 & 0 \\ 1 & -2/3 & 1 \end{vmatrix}$$

After the tone scale look-up table has been applied to the image, the image data is rotated back to printing density space using the matrix t_space_inv.mat.

Printer Section (box 60)

The next step in the process is to map the balanced image through a hard copy media (color photographic paper) characteristic curve (box 62). The printing density values of the balanced image are mapped to the appropriate print density values for negative photographic print paper. The finished process produces an image that is color and density balanced, and in a print density metric. The photographic paper curve is balanced.

Unsharp Masking Process

The final step prior to actually printing the image is the sharpening process (box 64). An unsharp masking algorithm is applied to every image just prior to printing. The unsharp masking equation is as follows.

$$D_c(x) = D(x) + \beta(D(x) - \int \phi(\xi) D(x-\xi) d\xi)$$

In this equation, $D_c(x)$ is the "sharpened" density at position x, $D(x)$ is the starting density at position x, the recommended value of β is 2.5, and the integral values at each pixel position are computed by convolving the image with the kernel, below.

$$\frac{1}{325} * \begin{bmatrix} 0 & 1 & 5 & 1 & 0 \\ 1 & 21 & 38 & 21 & 1 \\ 5 & 38 & 60 & 38 & 5 \\ 1 & 21 & 38 & 21 & 1 \\ 0 & 1 & 5 & 1 & 0 \end{bmatrix}$$

The red, green, and blue images are all sharpened to the same level.

The recommended value for β was established by adjusting the value upwards until pictures, when printed, began to appear with unacceptable levels of digital artifacts. These artifacts appeared as ringing, or halos, on edges yielding images that appear unnatural.

This value of beta is then applied to a square wave target to measure the modulation transfer function for the final processed image. The test to establish the full system MTF response is as follows. First, a target is photographed using a color negative film. The original target has a square wave pattern of approximately 40% modulation. The spatial frequency response values for each frequency of square wave pattern is 100% through all of the system visible frequencies. The film image was scanned on the digital scanner to produce a 1024×1536 pixel digital image for subsequent processing. This image was processed through our SBA plus sharpening path and printed. The spatial frequency response of the final print was measured with a high resolution microdensitometer, and the data analyzed using a harmonic analysis process. Table 1 lists the red, green, and blue response measured in this test (average of four samples) and represents the maximum MTF before significant artifact production occurs.

The MTF curve measured using this process represents the maximum spatial frequency of any digital processing system for Digital Photofinishing. This as the final print image is a combination of camera lens, film, scanner, algorithm, print engine, and print media. Any combination of these elements that yields and MTF curve of this result, or any result below the values listed in Table 1, will be considered as part of this invention. The set of parameters considered for this system, including the sharpening algorithm, are the maximum level of boost before going into a condition of oversharpening. Values of beta lower than that specified in the report are considered within the scope of this invention because these values also deliver prints that meet our printing requirements for making digital prints. If one of the system components is changed, then the beta value will be changed to assure that any final image produced by this digital path will achieve the upper limit MTF curve.

TABLE 1

Maximum MTF Values

| Freq | Red | Green | Blue |
|---|---|---|---|
| 0.0 | 1.0000 | 1.0000 | 1.0000 |
| 0.5 | 0.9813 | 1.0500 | 1.0785 |
| 1.0 | 0.9680 | 1.1180 | 1.1423 |
| 1.5 | 0.8735 | 1.0840 | 1.0948 |
| 2.0 | 0.7118 | 0.924 | 0.9298 |
| 2.5 | 0.5263 | 0.7170 | 0.7170 |
| 3.0 | 0.3523 | 0.5380 | 0.5238 |
| 3.5 | 0.2225 | 0.3970 | 0.3725 |
| 4.0 | 0.1510 | 0.2910 | 0.2688 |
| 4.5 | 0.1150 | 0.2140 | 0.2023 |
| 5.0 | 0.0893 | 0.1610 | 0.1593 |
| 5.5 | 0.0690 | 0.1250 | 0.1308 |
| 6.0 | 0.0530 | 0.1000 | 0.1095 |
| 6.5 | 0.0410 | 0.0840 | 0.0945 |

Notes:
(1) The column labeled "Freq" is spatial frequency in cycles/mm on a 4R reflection print, and the columns labeled as colors are the response values for that color at each spatial frequency.
(2) The MTF values are given for a 4" × 6" print, 250 dots per inch, and 1024 × 1536 pixels.

Psycho-physical experiments were conducted to compare these digital path prints to a convention optical printing path. The optically printed images were prepared using a CLAS 35 optical printer running in the full order printing mode, thus emulating the SBA operating in our digital path. The scene balance algorithm parameters used in the digital and optical paths were the same so that similar prints could be prepared. Pairs of prints, digital and optical, were shown to a panel of three judges who were asked to choose the best print from the pair. In 75% of the pairs, the digital print was selected, citing sharpness as the reason. The remaining 25% were the optical prints selected because of grain build-up in the digital prints.

Printer

At this point in the process, the printing densities should be fully balanced and corrected. This image information can be printed through a simple printing density to print density look-up table.

In the simplest case (printing density to print density), the printing density values are mapped to the appropriate print density values for a positive photographic paper. The finished process produces an image that is color and density balanced, and in a print density metric. We find the most preferred mapping from the balanced digital color negative image onto the characteristic curve of the aim AgX paper results from mapping reference RGB printing densities representing an achromatic middle gray onto achromatic RGB paper densities. These RGB paper densities are a function of the print material image dye spectra.

The final step prior to actually printing the image is the sharpening process which has been described previously.

$$D_c(x)=D(x)-\beta(D_x-\int\phi(\xi)D(x-\xi)d\xi)$$

At this stage in the process, the encoded data is sent to a printing device that renders, or digitally prints, the information on hard copy media (box 66). A calibration process must be operating on this device such that the code values presented to the printer will yield the expected print densities.

Hard copy media includes media optimized for the print technology used, i.e., laser or CRT photographic printers, ink jet printer, thermal printer, electrophotographic printer, etc.

Printer Calibration

Printer calibration will be done as part of the image processing system maintenance such that test patch density differences between measured and expected densities of less than 0.01 are obtained. The simplest embodiment only requires a neutral scale calibration. In more complex applications, a color calibration may be necessary.

A series of uniform patches (at least 18) spanning the full range of printer code values are printed through an initial calibration LUT. This initial LUT must cover all those D/A count values that produce density on the print. The patch densities on the print are measured. With the initial LUT, the list of code values, respective densities of those patches, and the aim curve, a new calibration LUT can be calculated which should modify printing behavior according to the calibration aim.

It will be appreciated that image sharpening can be effected at other points in the image processing chain. It will also be appreciated that the goal of the image processing described herein is to produce images via digital printing that are similar to, or better than, images produced by optically printing negative film images. This can be done in a straight forward manner as described herein when using digital hard copy media having similar image dye spectra to the image dye spectra of the hard copy media (silver halide color paper) used in optical printing.

In general, scene contrast modification algorithms contain adjustable parameters that provide a mechanism to improve the algorithm results for specific scenes, for specific capture media, and/or for specific customers. These adjustable parameters may be fixed for a specific software version embodiment of the algorithm. Or they may be obtained by the software embodiment of the algorithm from different sources. They may be encoded on the capture media optically or magnetically. They may be encoded on optical, magnetic, or other media that accompany the capture media. They may be selected or supplied, directly or indirectly, by the customer or processing lab. They may be accessed from a software embodiment database, based on the film type, lab preference, or customer preference. They may also be accessed via the intranet from an available repository, based on the film type, lab preference, or customer preference.

The invention has been described in detail with particular reference to certain preferred embodiments thereof, but it will be understood that variations and modifications can be effected within the spirit and scope of the invention.

PARTS LIST 10 digital photofinishing system
12 digital scanner
14 color media
16 color image frame
18 image data manager
20 printer
22 color hard copy media
24 user input
26 computer readable storage media input
30 digital image acquisition
32 image on photographic media
34 produce full resolution digital image
40 analytical section
42 create subsampled digital image
44 scene balance algorithm (SBA)
46 contrast normalization algorithm (CNA)
48 underexposure gamma algorithm
50 image processor section
52 underexposure gamma algorithm
54 apply SBA shift values
56 contrast normalization algorithm
60 printer section
62 hard copy media characteristic curve
64 sharpening process
66 hard copy media

What is claimed is:

1. A method of digital photofinishing comprising the steps of:

producing a digital color negative image in printing or other densities of a color image captured on a color negative photographic element which is optimized for producing a color image suited for conversion to an electronic form and subsequent reconversion into a viewable form;

mapping said printing densities of said digital color negative image to the printing densities that would have been obtained for reference color negative photographic element;

processing said mapped digital color negative image with an underexposure scene balance algorithm;

mapping said processed digital color negative image through a hard copy media characteristic curve to produce a digital color positive image;

sharpening said mapped digital color positive image with a sharpening algorithm optimized to avoid unacceptable artifacts; and digitally printing said sharpened digital color image onto hard copy media.

2. The method of claim 1, wherein said processing step processes said mapped digital color image with one or both of an underexposure gamma correction algorithm and a contrast normalization algorithm in addition to said scene balance algorithm.

* * * * *